United States Patent
Tsai et al.

(10) Patent No.: US 11,233,316 B2
(45) Date of Patent: Jan. 25, 2022

(54) WIRELESS VIRTUAL REALITY (VR) DEVICES

(71) Applicant: HEWLETT-PACKARD DEVELOPMENT COMPANY, L.P., Houston, TX (US)

(72) Inventors: Ming-Shien Tsai, Taipei (TW); Yk Hsieh, Taipei (TW); Chung-Chun Chen, Taipei (TW); Leo Joseph Gerten, Austin, TX (US); David Hsieh, Taipei (TW)

(*) Notice: Subject to any disclaimer, the term of this patent is extended or adjusted under 35 U.S.C. 154(b) by 285 days.

(21) Appl. No.: 16/092,085

(22) PCT Filed: Jul. 29, 2016

(86) PCT No.: PCT/US2016/044759
§ 371 (c)(1),
(2) Date: Oct. 8, 2018

(87) PCT Pub. No.: WO2018/022094
PCT Pub. Date: Feb. 1, 2018

(65) Prior Publication Data
US 2019/0165457 A1    May 30, 2019

(51) Int. Cl.
*H01Q 1/27* (2006.01)
*H01Q 25/00* (2006.01)
(Continued)

(52) U.S. Cl.
CPC .......... *H01Q 1/273* (2013.01); *A63F 13/211* (2014.09); *A63F 13/212* (2014.09);
(Continued)

(58) Field of Classification Search
CPC .......... H01Q 1/273; H01Q 1/22; H01Q 21/00; A63F 13/21; A63F 13/23; A63F 13/25; A63F 13/26; A63F 13/52
(Continued)

(56) References Cited

U.S. PATENT DOCUMENTS 9,092,898 B1   7/2015   Fraccaroli et al.
9,160,064 B2   10/2015  Ferguson
(Continued)

FOREIGN PATENT DOCUMENTS

CN    1617616 A      5/2005
CN    201611686 U   10/2010
(Continued)

OTHER PUBLICATIONS

LYNwave Introduces Smart Antenna Solution, Jun. 3, 2016, <http://www.digitimes.com/supply_chain_window/story.asp?datepublish=2016/05/30&pages>.

*Primary Examiner* — Andrea Lindgren Baltzell
(74) *Attorney, Agent, or Firm* — HPI Patent Department

(57) ABSTRACT

The present subject matter relates to wireless VR devices. In an example implementation of the present subject matter, wireless VR devices are described. In an example, a wireless VR device includes a first array antenna disposed on a headband of the wireless VR device to communicate wirelessly. The wireless VR device also includes a second array antenna disposed on a display unit of the wireless VR device to wirelessly communicate with the docking station. In an example implementation, the first array antenna and the second array antenna have an omni-directional radiation pattern.

6 Claims, 3 Drawing Sheets

(51) Int. Cl.
  *A63F 13/25* (2014.01)
  *A63F 13/212* (2014.01)
  *A63F 13/5255* (2014.01)
  *A63F 13/26* (2014.01)
  *H04B 1/38* (2015.01)
  *A63F 13/235* (2014.01)
  *A63F 13/211* (2014.01)
  *H01Q 21/20* (2006.01)
  *H04B 1/3827* (2015.01)
  *H01Q 1/22* (2006.01)
  *H01Q 21/00* (2006.01)
  *H01Q 21/06* (2006.01)

(52) U.S. Cl.
  CPC ............ *A63F 13/235* (2014.09); *A63F 13/25* (2014.09); *A63F 13/26* (2014.09); *A63F 13/5255* (2014.09); *H01Q 1/2291* (2013.01); *H01Q 21/0087* (2013.01); *H01Q 21/061* (2013.01); *H01Q 21/205* (2013.01); *H01Q 25/00* (2013.01); *H04B 1/38* (2013.01); *H04B 1/385* (2013.01); *A63F 2300/8082* (2013.01); *H04B 2001/3866* (2013.01)

(58) Field of Classification Search
  USPC .......................................................... 343/718
  See application file for complete search history.

(56) References Cited

U.S. PATENT DOCUMENTS

| | | | |
|---|---|---|---|
| 9,281,559 | B2 | 3/2016 | Ransom et al. |
| 2004/0150570 | A1 | 8/2004 | Yuasa et al. |
| 2012/0278192 | A1 | 11/2012 | Shirron et al. |
| 2014/0023995 | A1 | 1/2014 | Jones et al. |
| 2014/0072078 | A1* | 3/2014 | Sergeyev ................. H04B 7/08 375/316 |
| 2014/0187179 | A1* | 7/2014 | Ferguson ............... H01Q 1/273 455/77 |
| 2014/0347249 | A1 | 11/2014 | Bourilkov et al. |
| 2015/0253574 | A1 | 9/2015 | Thurber |
| 2016/0005233 | A1 | 1/2016 | Fraccaroli et al. |

FOREIGN PATENT DOCUMENTS

| | | |
|---|---|---|
| CN | 104009277 A | 8/2014 |
| CN | 104577355 A | 4/2015 |
| CN | 105242400 A | 1/2016 |
| JP | 2002112287 A | 4/2002 |
| WO | WO-2013154584 | 10/2013 |
| WO | WO-2015149274 A1 | 10/2015 |

* cited by examiner

WIRELESS VIRTUAL REALITY (VR) DEVICES

BACKGROUND

Virtual Reality (VR) devices provide immersive virtual experience to users by replicating real-environments in form of 3 dimensional (3D) simulations on the VR device's display. Generally, for providing the virtual reality experience to the user, VR devices are provided as wearable headsets and include a headband along with a display unit. The headband is worn around the head of a user such that the display unit covers the eyes and rests on the face of the user. The display unit includes various components, such as display, head motion tracking sensors, gaming controllers, control buttons, and eye tracking sensors. The VR devices are generally connected to docking stations, such as computing systems, gaming stations, and smartphones, via a cable through which multimedia content is streamed to the VR devices.

BRIEF DESCRIPTION OF DRAWINGS

The following detailed description references the drawings, wherein.

DETAILED DESCRIPTION

Figure 1:
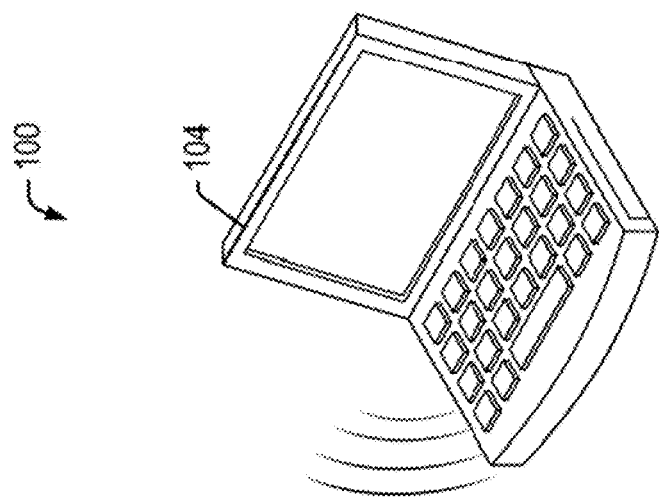
FIG. 1 illustrates communicating environment implementing a wireless virtual reality (VR) device, according to an example implementation of the present subject matter.
Figure 1:
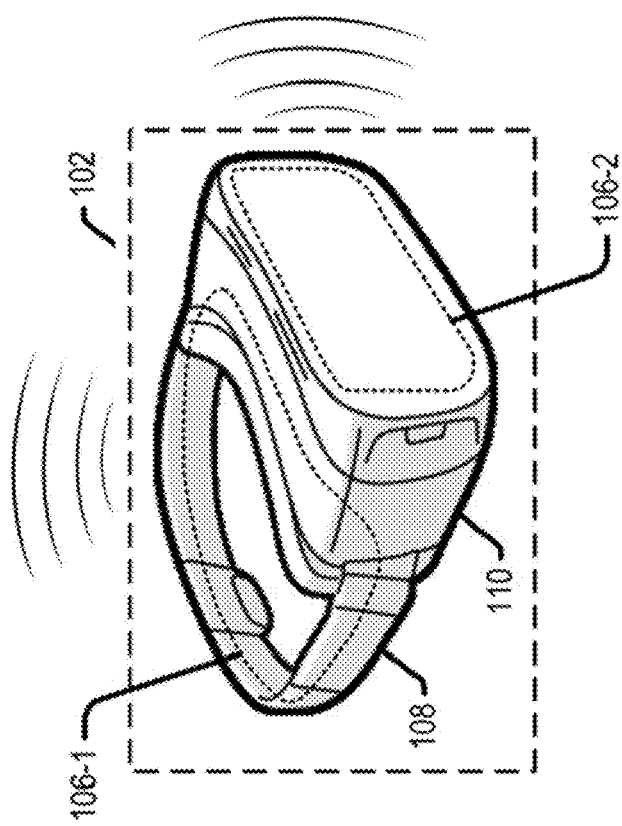

The present subject matter relates to wireless virtual reality (VR) devices. The described techniques allow VR devices to wirelessly exchange data in all directions, thereby allowing omni-directional communication between the VR devices and the docking stations. While the techniques of the present subject matter have been described in reference to VR devices, it would be noted that the techniques may also be implemented in other communication devices, such as Augmented reality devices.

Generally, VR devices communicate with docking stations through wired connections, such as Universal Serial Bus (USB) cables and High-Definition Multimedia Interface (HDMI) cables. The data exchanged between the VR devices and the docking stations mostly includes multimedia content, which is continuously rendered on VR device's display for seamless virtual user experience. However, the use of wired connections limit the range of communication, and also limit the capability of the users to move freely while connected to the docking station.

Some VR devices implement antennas for wireless exchange of data between the VR devices and the docking stations. However, the design and placement of such antennas provide limited coverage and narrow apertures for communication. Directional coverage and limited aperture affects the rate of exchange of data between the VR devices and the docking stations. Exchange of multimedia content at a reduced rate causes delayed and interrupted rendering of the multimedia content, thereby reducing the virtual experience of the users. Further, limited coverage of the antennas restrict users from utilizing interactive multimedia content that involve movements of the VR device and change or orientation of the users.

According to example implementations of the present subject matter, techniques for enabling wireless communication between the VR devices and the docking stations are described. The described techniques allow communication between VR devices and the docking stations in all directions at high rates of data exchange. Further, the described techniques allow for latency free exchange of multimedia content between the VR devices and the docking stations, thereby allowing interruption free rendering of the multimedia content. Furthermore, the described techniques also allow utilization of interactive multimedia content by the users by ensuring coverage of antennas in all directions of the VR device.

In an example implementation of the present subject matter, a wireless VR device is described. The wireless VR device may include a headband and a display unit coupled to the headband. The display unit may include different components, such as a display, control buttons, and various sensors. In an implementation, the wireless VR device may include a first array antenna disposed on the headband, and a second array antenna disposed on the display unit of the wireless VR device. The first array antenna may be a combination of multiple antennas arranged to form an array antenna. Similarly, the second array antenna may also include multiple antennas arranged to form an array antenna. Further, the first array antenna and the second array antenna may have an omni-directional radiation pattern.

In an example implementation of the present subject matter, radiation plane of the first array antenna is at a predefined angle to a radiation plane of the second array antenna. That is, the first array antenna and the second array antenna are arranged such that the radiation planes of the first array antenna and the second array antenna are at predefined angle to each other. It would be noted that each array antenna includes a radiation plane depending upon the arrangement and structure of the antennas. Therefore, the first array antenna and the second array antenna have radiations planes at the predefined angle and may have omni-directional radiation patterns.

Further, the wireless VR device may also include a sensing unit to determine relative location of the docking station, with respect to the wireless VR device. The determination of the relative location of the docking station may allow the sensing unit to regulate radiations of the first array antenna and the second array antenna for beamforming and directional exchange of data between the wireless VR device and the docking station. For example, the sensing unit may determine that the docking station is located opposite to the display unit of the wireless VR device. Based on such a determination, the sensing unit may regulate the radiation pattern of the array antennas, such as the first array antenna and the second array antenna to form a beam, opposite to the display unit of the wireless VR device.

Moreover, the first array antenna and the second array antenna may operate at about 60 Giga Hertz (GHz), based on Wireless Gigabit Alliance (WGA) or WiGig protocol of communication. The communication of data at 60 GHz may allow efficient and timely transfer of multimedia content between the wireless VR device and the docking station. In an example implementation of the present subject matter, the first array antenna and the second array antenna may be printed onto a flexible circuit board to firm on-chip antennas. The flexible circuit board may allow folding and bending of the first array antenna and second array antenna while the wireless VR device is in use by the users.

Therefore, the use of multiple array antennas on the VR device, operating at about 60 GHz and exchanging data by beamforming allows for efficient data transfer between the wireless VR devices and the docking stations. Further, the use of flexible circuit board for printing the first array antenna and the second array antenna allows the antennas to be paced on the headband of the wireless VR device, providing an omni-directional coverage.

The above techniques are further described with reference to FIG. 1, FIG. 2, and FIG. 3. It should be noted that the description and the figures merely illustrate the principles of the present subject matter along with examples described herein, and should not be construed as a limitation to the present subject matter. It is, thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a communication environment 100, according to an example implementation of the present subject matter. The communication environment 100 includes a wireless VR device 102 communicating with a docking station 104. The wireless VR device 102 may be a VR device including multiple antennas which may allow the VR device to wirelessly communicate with the docking station 104. Further, the wireless VR device 102 may include a headband 108 and a display unit 110. The headband 108 may be coupled to the display unit 110 of the wireless VR device 102 such that the headband 108, while strapped to the head of the user, may support the display unit 110.

The docking station 104 may include any computing device, such as desktop computers, hand-held computing devices, laptops portable computers, network computers, or wireless handheld devices, such as mobile phones, personal digital assistant (PDA), smart phones dash top mobiles, and multi-media enabled phones, which are capable of wirelessly streaming data to the wireless VR device 102.

The docking station 104 may be connected to a communication network (not shown), which may be a wireless or a wired network, or a combination thereof. The communication network may be a collection of individual networks, interconnected with each other and functioning as a single large network, for example, the internet or an intranet. Few or all of the communication network may be implemented as one of the different types of networks, such as local area network (LAN), wide area network (WAN), Wireless Local Area Network (WLAN), and such. Further, the communication network may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other.

In an example implementation of the present subject matter, the wireless VR device 102 may include multiple antennas for wirelessly communicating with the docking station 104. In an example implementation, the wireless VR device 102 may implement a first array antenna 106-1 and a second array antenna 106-2. The first array antenna 106-1 and the second array antenna 106-2 may be disposed on the wireless VR device 102 such that the antennas form an omni-directional radiation pattern. For example, the first array antenna 106-1 may be disposed onto the headband 108 of the wireless VR device 102 and the second array antenna 106-2 may be disposed onto the display unit 110 of the wireless VR device 102. Further, the first array antenna 106-1 and the second array antenna 106-2 may operate at different frequencies of communication, such as 60 GHz.

The first array antenna 106-1, disposed onto the headband 108 of the wireless VR device 102, may be printed on a flexible circuit board (FCB). The FCB may provide flexibility to the first array antenna 106-1, such that any change in shape of the headband 108 does not damage the first array antenna 106-1. In an example, the first array antenna 106-1 may be implemented as an on-chip antenna and disposed within the headband 108 of the wireless VR device 102. Similarly, the second array antenna 106-2, disposed onto the display unit 110 of the wireless VR device 102, may also be printed onto a FCB. Further, the second array antenna 106-2 may also be implemented as an on-chip antenna disposed within the display unit 110.

In an example implementation of the present subject matter, the first array antenna 106-1 and the second array antenna 106-2 may include multiple antennas, arranged together to form array antennas. For the ease of explanation, the antennas within an array antenna have been referred to as elements of the array antenna. It would be noted that the elements of the array antennas are generally separated by approximately "wavelength of the electromagnetic wave, divided by two" or '$\lambda/2$'. In other words, antenna elements are separated by $\lambda/2$ from one another for optimal array antenna performance. In an example implementation of the present subject matter, elements of the first array antenna 106-1 and the second array antenna 106-2, are separated by a distance of at least '$\lambda/2$'.

For example, if the first array antenna 106-1 and the second array antenna 106-2 are communicating at 60 GHz based on the WiGig protocol of communication, the wavelength '$\lambda$' may translate to 5 millimeters (mms). Accordingly, a spacing of 2.5 mms may be maintained between the elements of the first array antenna 106-1, and the elements of the second array antenna 106-2. It would be noted that the number of elements included within the first array antenna 106-1 and the second array antenna 106-2 may be based on the available area for implementation.

In an example implementation, the first array antenna 106-1 and the second array antenna 106-2 may include 5 elements each for wirelessly communicating with the docking station 104. In another example, the first array antenna 106-1 may include 10 elements while the second array antenna 106-2 may include 8 elements for wirelessly communicating with the docking station 104. Therefore, it would be noted that the first array antenna 106-1 and the second array antenna 106-2 may utilize different number of elements for wirelessly communicating with the docking station 104.

As described earlier, the wireless VR device 102 may implement multiple array antennas. While implementation of the first array antenna 106-1 and the second array antenna 106-2 has been depicted in reference of FIG. 1, it would be noted that more antennas may be implemented onto the wireless VR device 102 to improve the range and coverage of the wireless VR device 102.

In an example implementation of the present subject matter, the array antennas of the wireless VR device 102 communicate at different frequencies to exchange multimedia content with the docking station 104. For example, the first array antenna 106-1 and the second array antenna 106-2 may operate in DBand, i.e., on 60 GHz frequency band.

Figure 2:
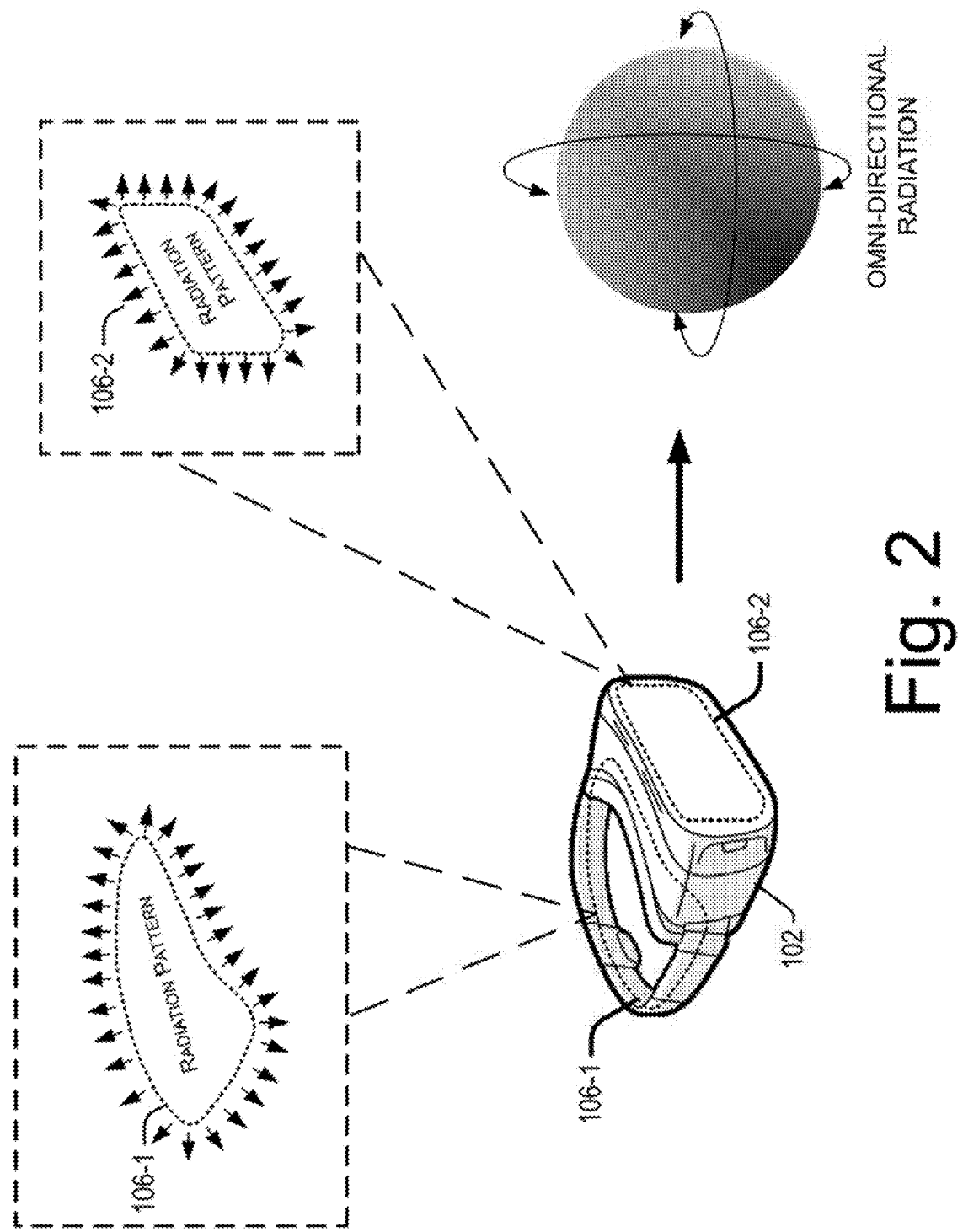
FIG. 2 illustrates radiation patterns of the wireless VR device, according to an example implementation of the present subject matter, and FIG. 3 a method of forming the wireless VR device, according to an example implementation of the present subject matter.

The radiation pattern of each of the first array antenna 106-1 and the second array antenna 106-2, along with other implementation details of the wireless VR device 102, have been further described in reference to FIG. 2.

FIG. 2 illustrates radiation patterns of the wireless VR device 102, according to an example implementation of the present subject matter. As described earlier, the first array antenna 106-1 and the second array antenna 106-2 may include multiple elements and have an omni-directional radiation pattern.

The first array antenna 106-1, implemented on the headband 108 of the wireless VR device 102, may be considered to be implemented on XY plane. Therefore, the radiation pattern of the first array antenna 106-1 may extend in the XY plane. The second array antenna 106-2, implemented on the display unit 110 of the wireless VR device 102, may be implemented on a perpendicular plane, with respect to the XY plane. Accordingly, the plane of the second array antenna 106-2 can be considered as XZ plane. Also, it would be accordingly noted that the radiation pattern of the second array antenna 106-2 may extend in the XZ plane. The presence of the radiation patterns in XY and XZ plane may therefore provide true omni-directional coverage to the array antennas of the wireless VR device 102.

Since the first array antenna 106-1 and the second array antenna 106-2 are disposed in perpendicular planes, the radiation planes of both the array antennas may also be perpendicular. And therefore, in the described example, the predefined angle between the radiation planes of the first array antenna 106-1 and the radiation plane of the second array antenna 106-2 may be 90 degrees. It would be noted that the plane of the first array antenna 106-1 and the second array antenna 106-2 may be varied, to vary the predefined angle between the radiation planes of the array antennas.

In an example, the array antennas of the wireless VR device 102 may communicate with the docking station 104 in a directional manner. That is, the wireless VR device 102 may regulate the radiation patterns of the array antennas for beamforming, such that the first array antenna 106-1 and the second array antenna 106-2 may form directed beams for communicating with the docking station 104.

In an example, the wireless VR device 102 may include a sensing unit (not shown). The sensing unit may determine position of the docking station 104, with respect to the position of the wireless VR device 102. The determination of the position of the docking station 104 may allow the sensing unit to regulate the radiations of the elements of the first array antenna 106-1 and the second array antenna 106-2, such that directional beams in the direction of the docking station 104 may be radiated by the array antennas. The utilization of beamforming may allow efficient communication between the wireless VR device 102 and the docking station 104.

In an example implementation of the present subject matter, the wireless VR device 102 may communicate with the docking station based on WiGig protocol of communication, at 60 GHz. In another implementation, the wireless VR device 102 may communicate with the docking station 104 at other frequencies of wireless communication.

Figure 3:
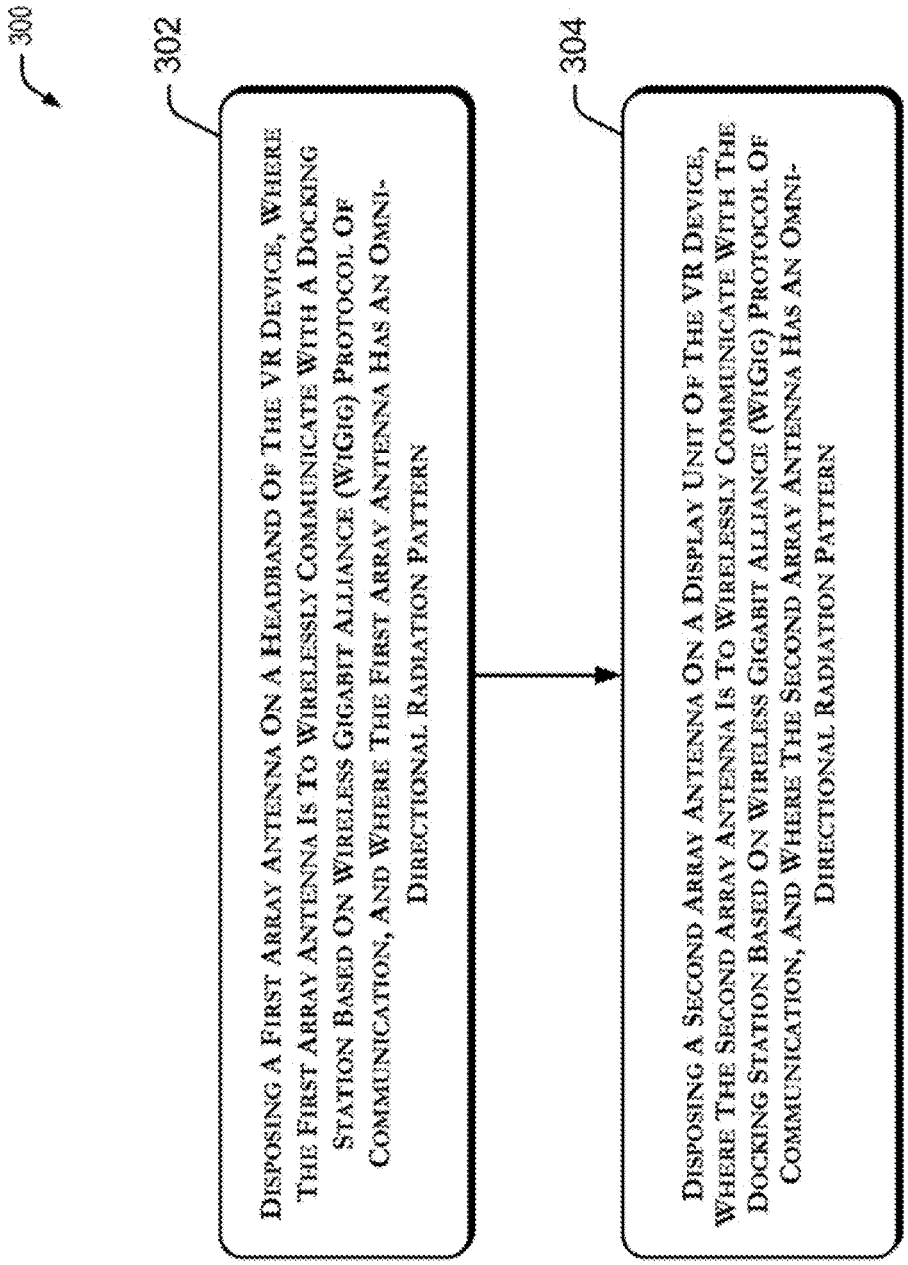

FIG. 3 illustrates a method 300 of forming a wireless VR device, in accordance to an example implementation of the present subject matter. The order in which the method 300 is described is not intended to be construed as a limitation, and any number of the described method blocks may be combined in any order to implement the method 300, or any alternative methods. Furthermore, the method 300 may be implemented by electronic circuits, or processor(s) through any suitable hardware, or combination thereof for forming the wireless VR device.

At block 302, a first array antenna is disposed on a headband of the VR device. In an example implementation of the present subject matter, the first array antenna may wirelessly communicate with a docking station based on Wireless Gigabit Alliance (WiGig) protocol of communication, and may have an omni-directional radiation pattern.

Further, the first array antenna may be printed on a flexible circuit board, for disposing onto the headband of the wireless VR device. Furthermore, the first array antenna may include 5 elements, to generate the omni-directional radiation patterns.

At block 304, a second array antenna is disposed on a display unit of the wireless VR device, such that the second array antenna wirelessly communicates with the docking station based on Wireless Gigabit Alliance (WiGig) protocol of communication, and may have an omni-directional radiation pattern. In an example implementation of the present subject matter, the second array antenna may include 5 elements to generate the omni-directional radiation patterns.

Although implementations of the present subject matter have been described in language specific to methods and/or structural features, it is to be understood that the present subject matter is not limited to the specific methods or features described. Rather, the methods and specific features are disclosed and explained as example implementations of the present subject matter.

We claim:

1. A wireless virtual reality (VR) device, comprising:
    a headband;
    a first array antenna disposed on the headband of the wireless VR device to communicate wirelessly, wherein the first array antenna has an omni-directional radiation pattern;
    a display unit coupled to the headband of the wireless VR device;
    a second array antenna disposed on the display unit of the wireless VR device to communicate wirelessly, wherein the second array antenna has an omni-directional radiation pattern;
    a sensing unit coupled to the first and second array antennas;
    a processor coupled to the sensing unit; and
    memory coupled to the processor, the memory storing instructions that upon execution by the processor, cause the processor to:
        determine a position of a docking station with respect to the VR device; and
        regulate radiations of the first and second array antennas for beamforming and directional exchange of data based on the determined position of the docking station.

2. The wireless VR device as claimed in claim 1, wherein the first array antenna is disposed such that a radiation plane of the first array antenna is at a predefined angle to a radiation plane of the second array antenna.

3. The wireless VR device as claimed in claim 2, wherein the radiation plane of the first array antenna is perpendicular to the radiation plane of the second array antenna.

4. The wireless VR device as claimed in claim 1, wherein the first array antenna includes at least five antennas arranged in an array.

5. The wireless VR device as claimed in claim 1, wherein at least one of the first array antenna and the second array antenna is printed as an on-chip antenna on a flexible circuit board.

6. The wireless VR device as claimed in claim 1, wherein the first array antenna and the second array antenna communicate at about 60 Giga Hertz (GHz), based on Wireless Gigabit Alliance (WiGig) protocol of communication.

\* \* \* \* \*